Aug. 21, 1962  A. POLLAK  3,050,605
SWITCH ACTUATING MECHANISM FOR SUBMERSIBLE SUMP PUMPS
Filed March 23, 1961
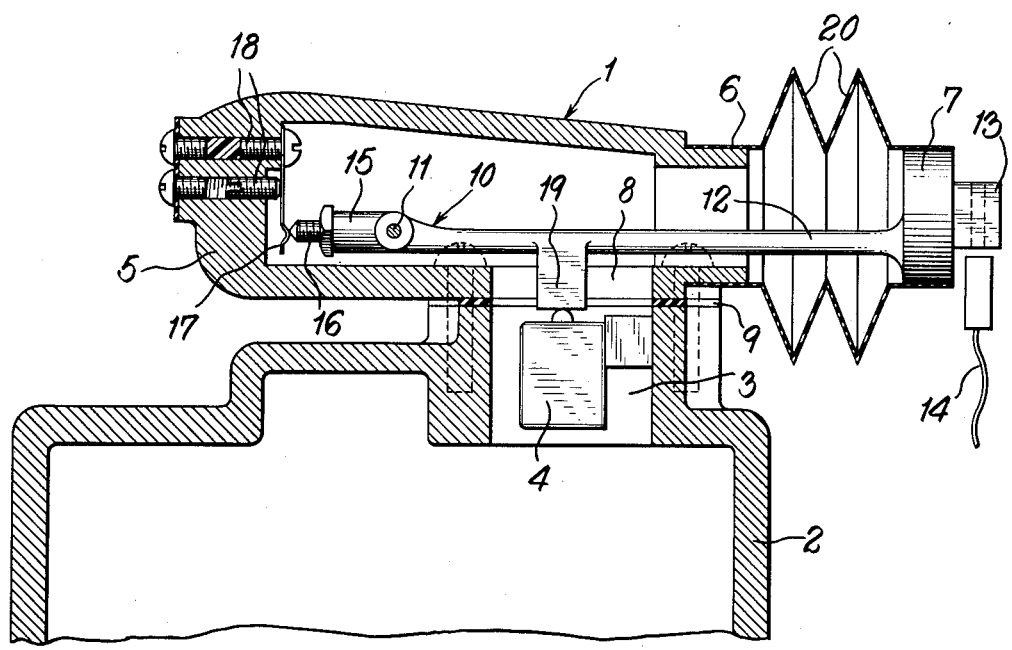
INVENTOR.
Abraham Pollak
BY
Benj. T. Rauber
ATTORNEY

United States Patent Office 3,050,605
Patented Aug. 21, 1962

3,050,605
SWITCH ACTUATING MECHANISM FOR SUBMERSIBLE SUMP PUMPS
Abraham Pollak, 1 Main St., Linfield, Pa.
Filed Mar. 23, 1961, Ser. No. 132,998
6 Claims. (Cl. 200—168)

My invention relates to a switch actuating mechanism for submersible sump pumps, particularly for submersible pumps of the type disclosed in my co-pending application Ser. No. 780,314, filed December 15, 1958, now Patent No. 3,005,068.

In submersible pumps of the above type a rotary impeller pump and an electric motor coupled thereto are submerged in water to be pumped. The periods of operation of the motor and pump are controlled by a float mechanism and a switch actuated thereby to start the motor when the level of the water to be pumped rises to a fixed upper limit and to stop the motor and pump when the water level falls to a fixed lower limit. To avoid excessive stopping and starting of the motor and pump the float mechanism and the starting switch must act quickly and positively at the time when the water level reaches its upper and lower limits. For this purpose the switch is actuated by a lever which acts by a snap motion from open to closed position and reversely as the water level reaches the fixed upper or lower limit.

To protect the motor and switch from the water in which it is submerged, they are enclosed in a water-tight casing or enclosure. The actuating lever, as shown in co-pending application Ser. No. 780,314, now Patent No. 3,005,068, has heretofore been mounted on the motor casing and connected to the switch within the motor through a flexible diaphragm, such as a sheet of vulcanized rubber or similar material sealed fluid-tightly in the motor casing.

This construction introduces a variable factor in the operation of the switch actuation which interferes with the accuracy of the starting and stopping of the motor. This is caused by the fact that the diaphragm is subject to the pressure of the air in the motor casing which increases as it is heated during the operation of the motor and decreases when it cools during periods of rest. The diaphragm is also subject to the hydrostatic pressure of the water which varies with changes in the water level. These variations in pressure are transmitted to the lever and switch mechanisms and tend to vary the limits of water level at which the lever will snap from one position to the other.

This variable interference with the action of the float mechanism, lever and switch is obviated in my present invention.

In my invention I provide on the motor casing a water-tight lever casing enclosing the switch and sealed water-tightly to the motor casing. The motor casing and lever casing have a common opening or passageway through which the lever is connected to the switch. In effect the motor and lever casings form a unitary casing sealed water-tightly, the motor casing and lever casing becoming communicating compartments in a common enclosure or casing. The lever casing or compartment has a cylindrical extension of flexible material, such as vulcanized rubber, sealed water-tightly to the casing and closed at its free end. One arm of the lever extends longitudinally of this extension and water-tightly through the closed end so that the part of the lever arm projecting outside of the casing may be attached to the float mechanism. The cylindrical extension being highly flexible, and being subjected to no unbalanced pressures, imposes no variable force to the tilting of the lever. To attain the highest flexibility of the extension it is preferably corrugated circumferentially to form a part of bellows form.

The various features of my invention are illustrated, by way of example, in the accompanying drawing which shows in vertical section a portion of the motor casing and the lever casing and lever mechanism. The motor is not shown and the switch is shown only in outline as they may be of any suitable form and construction and are not a material part of the present invention.

In the specific embodiment of the invention shown in the drawing, a lever casing 1 is mounted on the top wall of a motor casing 2. The motor casing 2 has an opening 3 in or near which a switch 4 may be conveniently mounted. The motor is not illustrated nor the details of the switch shown as they may be of any suitable and available type and construction.

The lever casing 1 is of an elongated construction integrally closed at one end 5. At the end opposite the closed end 5 there is mounted on and sealed to the lever casing an extension 6 of flexible vulcanized rubber composition or similar material. The free end of the extension 6 is closed by a plug 7 to seal the casing 1 water-tightly. The closure 7 forms a part of the lever. The lever casing is provided with an opening 8 which overlies the opening 3 of the motor casing to form a passage between the two casings and is sealed water-tightly to the motor casing about the opening by means of a gasket 9.

A lever 10 is pivotally mounted on a pivot 11 within the lever casing 1 and has an arm 12 extending through the extension 6 and through the closure 7, or is integral therewith, and has a projecting part 13 to which it may be connected by a wire 14, or other connection, to a float mechanism.

Extending in the opposite direction from the pivot 11 is a short lever arm 15 having and adjusting screw 16 extending therefrom. The adjusting screw contacts a spring 17 which is mounted by means of screws 18 in the end wall 5 of the lever casing. The spring 17 has a protuberance or rounded portion, as shown in the abovementioned co-pending application Ser. No. 780,314, so that in tilting in one direction or the other the adjusting screw must pass the protuberance and in doing so imparts to the lever a snap motion to open or close the switch 4 instantly. It will be understood, however, that other spring arrangements may be used in known manner to provide a snap action. The adjustment of the screws 16 or 18 enables the force of the snap action to be adjusted.

The lever 10 is operatively connected to the switch 4 through the opening 8 by means of a spur 19 which bears down on the switch 4 to open the switch when the arm 12 tilts downwardly. When the arm 12 tilts upwardly as the water level rises to its upper limit, the spur 19 rises free of the switch enabling it to close. It will be understood that other connecting means may be employed.

The extension 6 is freely flexible. To increase its flexibility it may be corrugated or ridged as at 20 to form a part of bellows form. Air pressures act uniformly about the periphery or circumference of the extension 6 and are, therefore, balanced so that regardless of the pressure in the motor casing the lever 10 may swing or tilt freely. Any increase or decrease in the pressure, therefore, does not influence the action of the lever 10. Air pressure acting against the closure 7 is transmitted longitudinally of the lever 10 and, therefore, cannot affect its tilting. Similarly hydrostatic pressures acting on the exterior of the extension 6 are balanced with respect to the tilting movements of the lever.

Having described my invention, what I claim is:
1. A float operated switch actuating mechanism for the motor of a submersible pump and motor assembly which comprises a fluid-tight casing, said casing comprising a flexible cylindrical extension close at its free end, a switch actuating lever pivoted in said casing and having an arm extending through said extension and fluid-tightly through its free end and a shorter arm extending in the opposite direction from said pivot of said lever, and a spring mounted in the end of said casing oposite said extension and having a portion rounded convexly to the end of said extension to impart a snap action to said lever as it passes from one tilted position to the opposite position.

2. A switch operating mechanism for the motor of a submersible pump and motor assembly which comprises a fluid-tight casing for the motor of said assembly, said casing having an opening, a lever casing mounted on said motor casing and having an opening sealed fluid-tightly to the opening of said motor casing to form a passage between said casings, an electric switch mounted in said casing adjacent said passage, said lever casing having a tubular extension of freely flexible material closed at its free end, a lever pivotally mounted in said lever casing and having an arm extending through said tubular extension and projecting through said closed free end thereof, a spring mounted in said lever casing and resiliently bearing against said lever to impart a snap motion thereto in tilting from one position to the other and an operating connection from said lever through said passage to said switch.

3. The mechanism of claim 2 in which said lever casing and extension are elongated transversely to said passage and said lever extends longitudinally within said casing.

4. The mechanism of claim 3 in which said spring is mounted in said lever casing to contact said lever endwise thereof and is rounded convexly of its contact with said lever.

5. The mechanism of claim 3 in which an arm of said lever extends over said passageway and has a spur extending in said passage into contact with said switch.

6. The mechanism of claim 3 in which said lever is pivoted intermediate its ends to provide an arm extending through said extension and an arm extending in the opposite direction into contact with said spring.

References Cited in the file of this patent
UNITED STATES PATENTS

| | | |
|---|---|---|
| 2,203,555 | Von Hoorn | June 4, 1940 |
| 2,457,153 | Hubbell | Dec. 28, 1948 |
| 2,717,941 | Steiner | Sept. 13, 1955 |